Oct. 21, 1969  R. W. KING  3,473,554
GROOVED VALVE SEAT FOR BLOCK AND BLEED VALVES
Filed Jan. 16, 1967

INVENTOR.
RUDY W. KING

BY Head & Johnson

ATTORNEYS

United States Patent Office 3,473,554
Patented Oct. 21, 1969

3,473,554
GROOVED VALVE SEAT FOR BLOCK
AND BLEED VALVES
Rudy W. King, Little Rock, Ark., assignors, by mesne assignments, to Orbit Valve Company, a corporation of Arkansas
Continuation-in-part of application Ser. No. 545,146, Apr. 25, 1966. This application Jan. 16, 1967, Ser. No. 609,680
Int. Cl. F16k *3/26, 3/30*
U.S. Cl. 137—312                                    2 Claims

ABSTRACT OF THE DISCLOSURE

A block and bleed type valve includes a valve seat having semi-elastomeric material annularly grooved and ported to provide separate and distinct seating surfaces relative to a valve core.

CROSS-REFERENCES TO RELATED APPLICATION

This invention is an improvement over prior U.S. Patent 3,131,906, issued May 5, 1964, and in particular is a continuation-in-part of copending application Ser. No. 545,146, filed Apr. 25, 1966, and since abandoned.

BACKGROUND OF THE INVENTION

This invention relates to improvements in fluid flow control valves and valve seat for particular utilization in what is known in the art as "block and bleed systems." Such systems have heretofore been utilized to connect differing stored fluids into a common flow line and outlet for dispensing. The problem inherent in many of the prior systems is in the event there is valve leakage from a particular identified fluid, the outlet flow line often becomes filled with an undesired fluid relative to what is desired to be dispensed by the next user. Hence, unless removed, contamination and intermingling of the fluids would result. For example, such a system is utilized in the dispensing of kerosene, gasoline and naptha from separate storage containers into a common dispensing outlet. Heretofore, dual spaced valves were positioned between the connection from a particular stored fluid to the common outlet flow line. A valved bleed circuit is connected between the two valves such that when the wto valves are closed, the bleed valve would be open. In the event of any leakage beyond the first of such closed valves, the fluid would not enter the main and common flow outlet but instead would be exhausted through the bleed to storage or waste and hence would not contaminate the common outlet line with possibly undesired fluids. However, it was found that this was a costly and involved method requiring numerous valves and numerous operations in the utilization of such a system.

SUMMARY

This invention overcomes the problems heretofore existing with the prior art devices and systems and provides a single valve and single valve seat with dual sealing faces. The faces are of a semi-elastomeric material molded or otherwise formed in combination with a metallic hardened ring. The valve seat is formed by spaced seating faces within a dissimilar insert separated by an annular groove within the same material. Provision is further made for interconnecting the annular groove or space between seating faces to the outside of the valve seat and the valve for bleed or other control purposes. Hence, this invention differs over that disclosed in copending application Ser. No. 545,146 in that a single annular seating face is essentially divided annularly by a groove to provide two separate seating faces for use with valves of the type shown in said prior application and with such valves illustrated in prior U.S. Patent 3,131,906 which are inclusive of use herewith.

DESCRIPTION OF THE PREFERRED EMBODIMENTS

Figure 1:
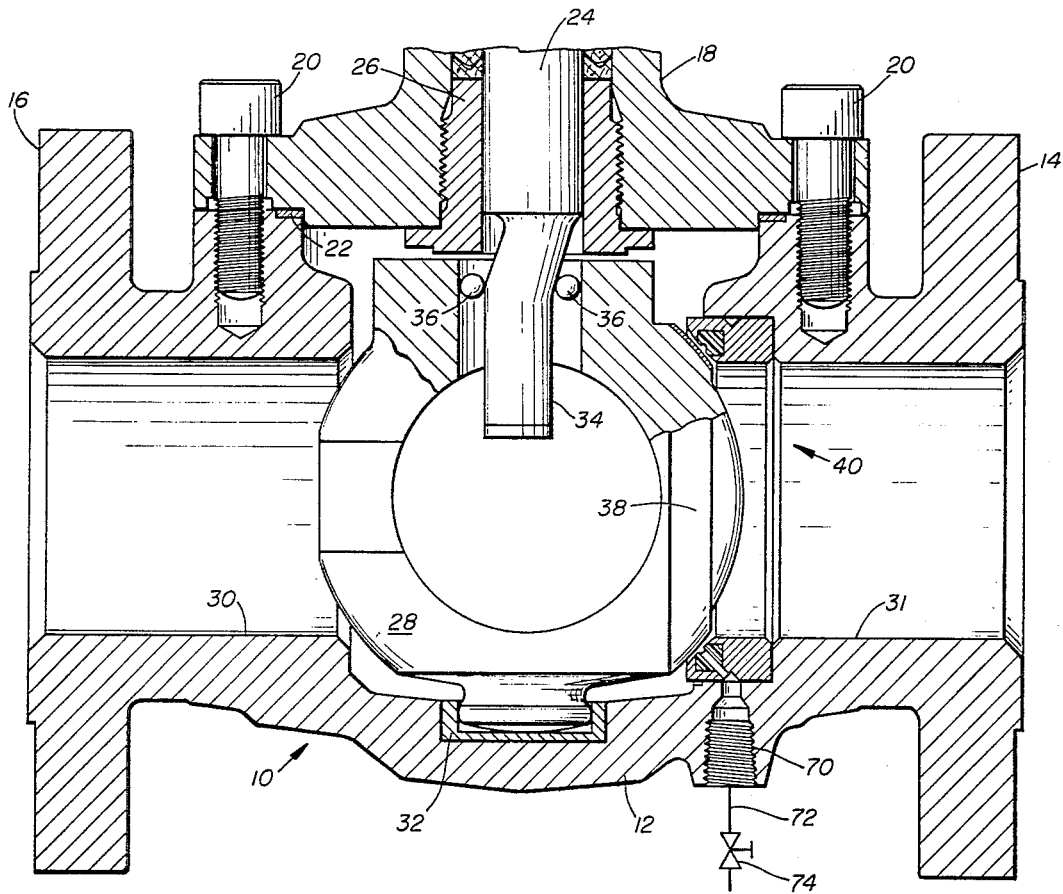
FIGURE 1 is a view, partly in cross section, of a typical valve arrangement, utilizing the valve seat of this invention.

Referring now to the drawings, FIGURE 1 depicts a valve typical of use in this invention and indicated generally by the numeral 10. Valve body 12 includes flanged connection members 14 and 16 for interconnection with a conduit within which the valve is to be inserted. Flanges 14 and 16 may be replaced by threaded or weld type connections, not shown, or by any other type of pipe connection device known in the art to mount the valve within the line.

An upper bonnet 18, shown only partially, is attached to body 12 by a plurality of bolts 20 between which a gasket 22 is positioned to provide a proper seal. Although a bolted connection is shown, it is understood that the upper bonnet may be welded to the body portion 12 or otherwise sealably retained. Bonnet 18 ordinarily extends upwardly and includes provision for a handle or crank (not shown) which serves to operate valve stem 24. The valve stem is positioned within bushing 26 which is threaded or otherwise attached to bonnet 18, as shown. Bushing 26 functions to hold the valve stem 24 in alignment relative to valve core 28. Suitable packing, gaskets or O-rings (not shown) are prvoided between the valve stem 24 and the bonnet 18 in a variety of arrangements to prevent any fluid leakage from the valve. Valve core 28 is the working member which serves to close and open the valve 10 and, according to its position, to either permit, prevent, or control flow of fluids through the axial openings 30 and 31 of the valve. The valve core 28 as shown in this valve design is rotatable and pivotal in trunnion bushing 32 at its lower end. The rotary and pivotal movement of the valve shown is accomplished through the combined rotary and linear movement of valve stem 24 with particular regard to the cam-like surface 34 relative to follower pins 36 formed as a part of valve core 28. The pivotal movement occurs upon the linear downward movement of stem 24 causing the core to pivot in bushing 32 wherein convexed annular surface 38 engages with the valve seat of this invention generally indicated by the numeral 40. Surface area 38 may be either integrally formed with the valve core 28 or may be a hardened stellite element affixed by welding, etc. Typical of the valve and valve core operation shown in FIGURE 1 is best described in prior Patents 2,076,840; 2,076,841; 2,516,947; and 2,719,022.

The valve seat 40 is preferably formed separately of body 12 and is pressed or shrink fitted into position such that the seating face is engageable with the surface 38 of core member 28. The valve seat is formed of a metallic ring portion 42, typically stainless steel, and is machined to define an arcuate seating face 44 which is interrupted by intersecting preformed grooves 46 and 48 forming an annular groove in ring portion 42 for the seat insert. These grooves are machined by an operation typically wherein a cutting tool is moved to the rotating valve seat, or vice-versa, forming a first groove 46 which is substantially perpendicular to the axis of the seat ring 40 and a second groove 48 which is substantially parallel thereto. As shown, the grooves terminate inwardly with rounded corners. Beveled surface 50 is positioned inwardly from the seating face 44 to form substantially a planar surface which is approximately 45° to the axis of the seat ring 40. At least one opening not shown is usually formed in the valve seat ring 42 interconnecting with either the rearward surface 52 or the outer periphery 54 which acts as a sprue hole for extrusion material to form dissimilar seating insert 56. Thereafter, the seat ring is positioned within an extrusion die or mold wherein insert 56 is placed. The insert material particularly useful in this invention is adequately described in the aforesaid patent and copending application which includes the trademarked synthetic resins "Teflon" and "nylon"-like materials. The entire seating face after extrusion or molding, generally conforms to the curvature 44. The insert 56 is thereafter machined to form annular groove 60 leaving exposed seating faces 62 and 64. Thereafter at least one and preferably two 90° arcuately spaced bleed openings 66 are drilled for interconnection between seating face groove 60 and peripheral groove 68 formed in seat ring 42. In assembly and preferably the two bleed openings are oriented in the valve body upwardly. That is, the openings, if 90° apart will be 45° above either side of the horizontal axis of the valve seat 40. Each of the openings 66 are of a diameter preferably no greater than the width of groove 60.

Formed in the valve body 12 is a bleed opening 70 which communicates opposite peripheral groove 68 of the valve seat when in position and thence to a bleed line 72 and valve 74.

Older valves can be accommodated to receive the valve seat of this invention merely by providing an opening 70 for the bleed line.

In use, such as with valve 10, valve seat 40 is sealably fitted into place as provided within valve body 12 so as to expose arcuate seating face 44 thereof tangentially to valve core 28 and in particular, its mating surface 38. The movement of the valve core as heretofore described provides radial surface contact between surface 38 and seating faces 62 and 64 and/or metallic seating face 44 on either side thereof.

An important use of this invention lies in the configuration of the valve seat for utilization in a block and bleed flow system as heretofore described. That is, when the valve of this invention is in the closed or seated position, as is almost occurred in FIGURE 1, any product fluid valve seat leakage, from wear or other means, beyond the seating engagement of surface 38 relative to faces 44 and 62 in contact therewith, will be directed immediately outward through openings 66 into the peripheral groove 68 and thence to bleed outlet conduit 70, 72 as controlled by a valve 74. Similarly, if any leakage should occur through axial passageway 31, bypassing the normally seated surface area 38 with seating faces 64 and 44 will also bypass into the bleed system as described.

The valve seat of this invention provides not only a metal to polymer seal (38 to 56) but also a metal to metal seal (38 to 44). Hence, there is established a secondary seat extending the useful life and safety of the valve.

Figure 2:
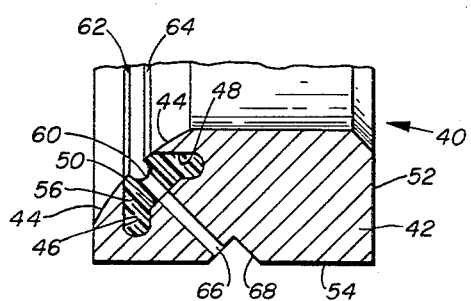
FIGURE 2 is an enlarged partial sectional view of the valve seating faces defined by this invention.
Figure 3:
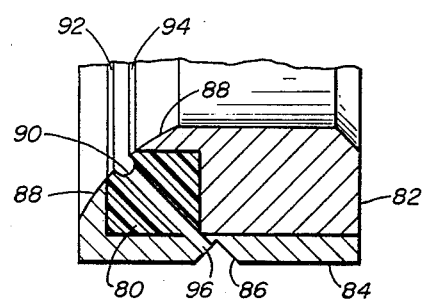
FIGURE 3 is an enlarged partial sectional view of an alternate valve seating embodiment incorporating the principles of this invention.

Referring now to the embodiment of FIGURE 3, the valve seat of this invention is formed by retaining a ring of dissimilar polymer material 80 as used and described herein between fitted and separate machine parts inner sleeve 82 and outer sleeve 84. Outer sleeve 84 is provided with a peripheral groove portion 86. The seating face 88 and material 80 is machined or otherwise formed to provide a metallic seating face 88 which is arcuate in cross section as shown. Seating material 80 is thereafter being machined to form groove 90 to define separate seating faces 92 and 94 spaced therefrom. Similar to the previous embodiments of FIGURES 1 and 2, suitable conduits 96 are formed to extend between groove 90 and peripheral groove 86 for bleed of accumulated fluids within the groove 90 that may bypass the valve seat when closed.

What is claimed is:
1. A block and bleed valve comprising,
a valve body having a passageway therethrough,
a valve core (28), and a substantially metallic valve seat ring (42) having a seating face (44) positioned in said body relative to said core, means to move said core away from or into engagement with said seating face to respectively open or close said passageway,
an annular opening intermediate said seating face, defined by substantially intersecting recesses, one recess (48) substantially coaxial, the other (46) substantially radial relative to the axis of said ring, said recesses interconnected inwardly from said face by a beveled face portion (50),
a semi-elastomeric insert material (56) formed in said opening and following the contour configuration of said face,
a normally open shallow groove (60) in said face of said insert leaving said insert face exposed (62 and 64) on both sides of said groove,
a second normally open groove (68) in the outer periphery of said ring, and
at least one normally open bleed conduit (66) extending from said shallow groove (60) to said second groove (68), a controllable flow conduit means in said body providing communication between said second groove (68) and the exterior of said valve body.

2. A block and bleed valve comprising,
a valve body (12) having a passageway therethrough;
a valve core (28);
a valve seat;
means to move said core away from or into engagement with said seat to respectively open or close said passageway;
said seat comprising:
an outer metallic sleeve member (84), an inner metallic sleeve member (82) and an insert ring of semi-elastomeric material (80) assembled to form an integral ring portion,
said sleeve members and said insert formed to define a seating face (88),
a normally open shallow groove (90) in said face of said insert leaving said insert face exposed (92 and 94) on both sides thereof said groove,
a second normally open groove (86) in the outer periphery of said outer sleeve, and
at least one normally open bleed conduit (96) communicating from said normally open shallow groove (90) to said second normally open groove (86);
a controllable flow conduit means in said valve body providing communication between said shallow groove (90) and the exterior of said valve body.

References Cited
UNITED STATES PATENTS

| | | | |
|---|---|---|---|
| 3,050,077 | 8/1962 | Wheatley | 137—312 |
| 3,131,906 | 5/1964 | King | 251—315 XR |
| 3,306,315 | 2/1967 | Cook | 137—246.22 |

WILLIAM F. O'DEA, Primary Examiner
RICHARD GERARD, Assistant Examiner

U.S. Cl. X.R.

251—163, 315; 277—75